United States Patent [19]

Albanesi et al.

[11] 4,416,728

[45] Nov. 22, 1983

[54] SELF-EXTINGUISHING PAPER MATERIALS

[75] Inventors: Giancarlo Albanesi; Gianfranco Rinaldi, both of Milan, Italy

[73] Assignee: Saffa S.p.A., Milan, Italy

[21] Appl. No.: 398,798

[22] Filed: Jul. 16, 1982

Related U.S. Application Data

[63] Continuation-in-part of Ser. No. 350,423, Feb. 19, 1982, abandoned.

[30] Foreign Application Priority Data

Mar. 5, 1981 [IT] Italy ................................ 20134 A/81

[51] Int. Cl.³ .............................................. D21H 3/56
[52] U.S. Cl. .................................... 162/159; 162/167; 162/181.9
[58] Field of Search ................... 162/159, 181.9, 167; 428/921; 106/18.14; 524/414; 523/205; 427/221; 422/403

[56] References Cited

U.S. PATENT DOCUMENTS

| 3,721,651 | 3/1973 | Yates | 260/29.4 R |
|---|---|---|---|
| 3,806,488 | 4/1974 | Stone et al. | 524/414 |
| 4,010,137 | 3/1977 | Brady | 524/414 |
| 4,105,735 | 8/1978 | Dany et al. | 524/414 |
| 4,138,356 | 2/1979 | Vincent et al. | 523/205 |
| 4,145,369 | 3/1979 | Hiro et al. | 523/205 |
| 4,182,839 | 1/1980 | Tesson | 528/254 |
| 4,187,207 | 2/1980 | Cerny et al. | 524/414 |
| 4,208,317 | 6/1980 | Cerny | 523/205 |

FOREIGN PATENT DOCUMENTS

| 52217 | 7/1981 | European Pat. Off. . |
| 1944056 | 3/1970 | Fed. Rep. of Germany . |
| 2655739 | 4/1978 | Fed. Rep. of Germany . |
| 1545716 | 5/1979 | United Kingdom . |

OTHER PUBLICATIONS

Chemical Abstracts, vol. 87, No. 20, Nov. 14, 1977 Cover page, and p. 30 (152949).
Chemical Abstracts, vol. 77, No. 6, Aug. 7, 1972, Cover page, and p. 130 (36629).

*Primary Examiner*—William F. Smith
*Attorney, Agent, or Firm*—Karl F. Ross; Herbert Dubno

[57] ABSTRACT

Self-extinguishing paper materials essentially consisting of paper pulps obtained from virgin chemical or reclaimed cellulose fibers and from red phosphorus powder encapsulated by a modified melaminic resin. These materials find practical industrial appliances especially as paperboard and in papers of various types requiring flame-retarding self-extinguishing characteristics.

10 Claims, No Drawings

SELF-EXTINGUISHING PAPER MATERIALS

CROSS REFERENCE TO RELATED APPLICATION

This application is a continuation in part of Ser. No. 350,423 filed Feb. 19, 1982, abandoned, and is also related to our application Ser. No. 314,049 filed Oct. 22, 1981.

FIELD OF THE INVENTION

This invention relates to materials essentially consisting of virgin or reclaimed cellulose and other fibres, particularly to paper materials which possess a high degree of self-extinguishing property attained by incorporating thereinto a high-efficiency substance as flame retarder.

BACKGROUND OF THE INVENTION

The abbreviated term "paper materials", whenever used herein, means all of those materials essentially consisting of cellulose fibers and known, e.g. as waste paper pulp, mechanical pulp, unbleached pulp, bleached pulp, etc. whether or not containing additives and coadjuvants such as binders, fillers, dyes and the like. As is known, paper, paperboard and the like, and relevant applicative products, i.e. products made from paper materials, maintain their combustion once it has started, and because of the lack of self-extinguishing properties their use involves serious risks of fire in many applicative fields. Hence the use of paper materials has been restricted or substantially inhibited in such fields. To obviate the lack of self-extinguishing properties of said materials and products—such as Kraft paper, paperboard, etc.—or at least to reduce the inflammability thereof, various inorganic and/or organic chemical compounds—known as flame retarders—such as, for example: aluminum silicates and phosphates; ammonium sulphates and phosphates along with sodium bicarbonate; ammonium phosphates and polyphosphates, in some cases with melamine; borax-sodium silicate mixtures; salts of phosphorated polyalkyltriazines; amido-polyphosphates; tetrakis-(hydroxymethyl)-phosphonium chloride; hexahydro-triazine phosphonates and derivatives; cellulose ammonium-phosphate with melamine; melamine phosphates; guanyl-urea; copolymers with methyl phosphenyl-isocyanate; diazo-phospholidinones; halogenated polymers; and antimonium aminoalkoxides can be used.

However, these compounds exhibit, depending upon the different utilization modes and media, some drawbacks which do not always render them satisfactory for many applicative fields. For example some of the additives are hygroscopic and easily washable out or swellable by water, so that the physical-mechanical properties of the materials are of low stability in the long run, or because they can evolve, during combustion, very irritant and/or toxic gases, or finally because they are not capable of imparting a sufficient flame retarding effect.

We have developed a flame retarder for other classes of materials substantially different from the paper materials, namely a few types of polymeric material. This retarder is red phosphorus in a form which does not induce in the materials to which it is added, undesirable phenomena of hygroscopicity or instability in the long run any of the mechanical characteristics of practical importance. The red phosphorus powder itself may exhibit drawbacks of hygienic-environmental nature in connection with the fact that red phosphorus, when in contact with the air humidity, generates phosphine (notoriously toxic) during the procedures for incorporating it into the materials to be rendered self-extinguishing, besides during the preceding handlings thereof.

OBJECTS OF THE INVENTION

It is an object of the present invention to provide paper materials which exhibit good self-extinguishing properties, and which are free from the defects and drawbacks mentioned hereinbefore.

Another object of the invention is to extend the principles of our above described copending applications.

DESCRIPTION OF THE INVENTION

These and other objects, which will be more clearly apparent to those skilled in the art from the following detailed description, are achieved, according to the present invention, by a paper composition—in the form e.g. of paperboard, Kraft paper and the like—comprising red phosphorus powder in its various allotropic forms, encapsulated with a particular melaminic resin (hereinafter referred to as modified melaminic resin), said powder being obtained as described in co-pending Italian patent application No. 26064 A/80 of Nov. 19, 1980 and the corresponding U.S. patent application Ser. No. 314,049 filed Oct. 22, 1981. More particularly, said powder is obtained by preparing a hydrodispersion of red phosphorus powder (having a particle size below 100 microns) in a solution in water of a cationized melaminic condensate, prepared from melamine, formaldehyde, triethanolamine and a monohydroxyl aliphatic alcohol having less than 5 carbon atoms heating said hydrodispersion while stirring, thus obtaining the encapsulation of the individual red phosphorus particles by precipitation thereonto of the above-said condensate in the form of an insoluble, partially cross-linked melaminic resin, then in completing the cross-linking during a successive drying step, thereby obtaining a red phosphorus powder encapsulated and consequently stabilized against the generation of phosphine.

The starting components of said melaminic condensate comprise formaldehyde, methanol, triethanolamine and melamine in weight %-ratios of 36.04–30.85%, 8.82–21.96%, 29.87–25.57% and 25.27–21.62%, respectively.

DESCRIPTION OF THE PREFERRED EMBODIMENT

A preferred, but not exclusive, embodiment of self-extinguishing paper materials is obtained, according to the present invention, with compositions comprising paper pulp and red phosphorus powder encapsulated with melamine resin, in the quantitative ratios indicated herein-below in % by weight (referred to the "dry" material):

paper pulp—96–85%
  red phosphorus powder encapsulated with 3–5% of "modified" melaminic resin—4–15%

The above-indicated compositions are given for indicative but not limitative purposes within the scope of the inventive concept of the present invention.

The preparation of the abovesaid self-extinguishing paper materials is easily feasible by employing the conventional additivation and mixing techniques, which are known in the technique in general and to those skilled in the art in particular.

A preferred, although not unique, embodiment for obtaining said red phosphorus powder encapsulated with modified melaminic resin, consists in preparing the hydrodispersion of red phosphorus in powder having a particle size below 40 microns, in an aqueous solution of a melamine condensate prepared from 25.27% melamine, 36.04% formaldehyde, 8.82% methanol and 29.87% triethanolamine, cationized with hydrochloric acid, in heating said dispersion, under stirring, at about 100° C., so obtaining the encapsulation of the red phosphorus individual particles, due to slow precipitation thereonto, in a continuous and compact layer, of said condensate in the form of a partially cross-linked insoluble melaminic resin, the cross-linking thereof is completed during a successive dehydration step by drying in an inert gas flow, or preferably under vacuum, at about 100° C. until formaldehyde does no longer form, so obtaining a powder of encapsulated red phosphorus.

More particularly, the abovesaid preferred embodiment of the invention comprises the following steps:

(a) preparing the melamine condensate: in a first step, methanol, triethanolamine, formaldehyde (the last substance in an aqueous solution at approximate 45% calculated on dry basis) are reacted for about 2 hours at approx. 85° C. in weight percent ratios, referred to the dry substance, respectively of 8.82%, 29.87% and 36.04%, the remaining 25.27% being the melamine which is to be added in a second step, at the end of the aforesaid reaction, in order to cause the melamine condensate to form by heating the aforesaid composition at about 90° C. for approx. 6 hours—the starting pH value of 9.5-9.8 being adjusted to the value of 7.4—7.8—till a viscosity of 420-470 centipoises at 20° C. is attained, whereupon, after having adjusted the pH to a value of 7-7.6, it is diluted with water, so obtaining a solution at about 38% of dry substance and with a viscosity of 40-50 centipoises at 20° C. pH adjustments are effected by means of hydrochloric acid in an aqueous solution at 18%, thus cationizing the melamine condensate.

(b) Encapsulating red phosphorus powder: a hydrodispersion of micronized red phosphorus powder having a density of 1.38-1.58 is combined with a desired amount of the aqueous solution at 38% of cationized melamine condensate, prepared as per point (a); the so obtained phosphorus dispersion in the melamine condensate solution is heated, under stirring, for about 1 hour at approx. 100° C., keeping substantially unaltered—by means of a condenser—the reaction mixture volume: under such conditions the melamine condensate precipitates slowly and uniformly (evolving formaldehyde) in the form of a resin partially cross-linked, at first in the liquid-viscous, then in the solid state, around the red phosphorus particles, so encapsulating them. Cross-linking is then completed during dehydration by drying of the product, preferably in a thin layer, at about 100° C. and in an inert gas flow or preferably under vacuum, till formaldehyde does not longer evolve. At the end an encapsulated red phosphorus powder is obtained, which is free-flowing, stabilized to phosphine forming and easily dispersible.

The compositions of the self-extinguishing paper materials object of the present invention are indicated more in detail in the examples which are given hereinbelow.

EXAMPLE 1

Self-extinguishing paper compositions (hereinafter indicated with PM/1, PM/2 and PM/3) of the "paperboard" 250 g/m$^2$ type, in which the paper material consisted of a "waste paper pulp", and the red phosphorus powder encapsulated with "modified" melamine resin—obtained according to the composition and process described in Example 1 of the cited co-pending patent application Ser. No. 314,049—was contained in said pulp respectively according to the following percentages by weight (referred to the dry material):

PM/1—12% encapsulated red phosphorus powder
PM/2—8% encapsulated red phosphorus powder
PM/3—6% encapsulated red phosphorus powder The aforesaid three paper compositions, along with a fourth comparative paper composition identical with them, except that it did not contain the encapsulated red phosphorus powder (hereinafter referred to as PM/0), were subjected to inflammability tests according to methods ASTM-D 635 (horizontal propagation) and UL 94 (Underwriter Laboratory; vertical propagation)—which, as is known, are specific methods for self-supporting plastic materials—slightly modified, as specified hereinbelow, to adapt them to the paperboard object of the present example:

ASTM-D 635: ignition time was reduced from 20 to 3 seconds; specimens thickness: 0.35 mm;
UL 94: ignition time was reduced from 10 to 3 seconds and the reference index fixed to 139 mm; specimens thickness: 0.35 mm.

For both methods a "microbunsen" burner with flame height of 33 mm was utilized. For each of the four above-mentioned compositions, 10 inflammability tests according to each of the abovesaid methods were carried out, whereby the following experimental data were determined: burning rate in cm/min. (in abbreviated form:burn.r.), flame time in seconds, glowing fire propagation time in seconds, and burning length in mm. The results obtained (groups of 10 data for each composition and for each method) were arithmetically averaged; in Table 1 there are recorded said average values, the highest value out of the ten averaged values being bracketed alongside the average values. In said Table, the abbreviations have the meanings already specified above, and furthermore "bel." means "below . . . .", and P/i means encapsulated red phosphorus powder.

EXAMPLE 2

Self-extinguishing paper compositions (hereinafter referred to as CG/1 and CG/2) of the 250 g/m$^2$ "paperboard" type, in which the paper material consisted of "unbleached pulp", and the encapsulated red phosphorus powder (identical with the one of Example 1) was contained in said pulp respectively according to the following percentages by weight (referred to the dry material):

CG/1—12% encapsulated red phosphorus powder
CG/2—8% encapsulated red phosphorus powder The abovesaid compositions, together with a third comparative composition identical with them, except that it did not contain red phosphorus powder (hereinafter referred to as CG/0) were subjected to the same tests of Example 1; the results obtained therefrom are recorded in Table 1.

EXAMPLE 3

Self-extinguishing paper compositions (hereinafter indicated by CS/1, CS/2 and CS/3) of the 250 g/m² "paperboard" type, in which the paper material consisted of "bleached pulp" and the encapsulated red phosphorus powder (identical with that of Example 1) was contained in said pulp respectively according to the following percentages by weight (referred to the dry product):

CS/1—15% encapsulated red phosphorus powder
CS/2—12% encapsulated red phosphorus powder
CS/3—8% encapsulated red phosphorus powder The abovesaid three compositions, along with a fourth comparative composition identical with them except that it did not contain the modified encapsulated red phosphorus powder (hereinafter referred to as CS/0), were subjected to the same tests of Example 1, the results obtained therefrom being recorded in Table 1.

TABLE 1

| Compos- itions | P/i % | burn.r. (cm/min) UL 94 | Flame time (000) UL 94 | ASTM D635 | Glowing fire time (000) UL 94 | ASTM D635 | Burning length (mm) UL 94 | ASTM D635 |
|---|---|---|---|---|---|---|---|---|
| PM/0 | 0 | 80.2 | — | — | — | — | total | — |
| PM/1 | 12 | — | 3.1 (5.0) | 1.4 (2.0) | 25.8 (35.0) | 8.2 (10.0) | 27.2 (48.0) | 9.0 (12.6) |
| PM/2 | 8 | — | 2.2 (3.0) | 2.3 (3.0) | 6.1 (8.0) | bel.5(5.0) | 7.4 (10.0) | 6.4 (9.6) |
| PM/3 | 6 | 74.5 | 9.2 (11.0) | 5.1 (7.0) | — | bel.5(4.8) | total | 9.8 (14.6) |
| CC/0 | 0 | 87.2 | — | — | — | — | total | — |
| CC/1 | 12 | — | 8.7 (18.0) | 1.9 (2.0) | 7.8 (12.0) | bel.5(6.0) | 21.2 (29.0) | 5.6 (7.6) |
| CC/2 | 8 | 83.4 | 8.2 (11.0) | 6.3 (11.0) | — | bel.5(2.0) | total | 8.4 (14.6) |
| CS/0 | 0 | 72.8 | — | — | — | — | total | — |
| CS/1 | 15 | 71.9 | 9.6 (12.0) | 2.2 (2.5) | — | 12.0 (13.0) | total | 9.4 (11.6) |
| CS/2 | 12 | — | 5.8 (8.0) | 2.2 (3.0) | 5.1 (7.5) | 5.9 (7.0) | 10.4 (14.0) | 8.6 (10.6) |
| CS/3 | 8 | 70.7 | 9.8 (11.0) | 10.6 (16.0) | — | bel.5(6.7) | total | 15.4 (21.6) |

For the paper compositions indicated in the foregoing three Examples it has been furthermore tested and ascertained that the encapsulated red phosphorus powder contained in said compositions is neither washed out by the water, nor is in any way perceptibly affected by same, thus imparting constant characteristics to the abovesaid compositions.

As is inferable from the data contained in cited Table 1, there are apparent the advantages offered by the present invention, such advantages being obtainable at the highest degree when employing specific amounts of encapsulated red phosphorus powder, contained in the various paper materials, as a function of the nature of the latter.

The compositions and the paper materials described and exemplified hereinbefore may be susceptible of modifications and variations, all falling within the scope of the inventive concept of the present invention.

In particular, said compositions and materials may contain additives and/or paper coadjuvants known in the art.

We claim:

1. A self-extinguishing paper material consisting essentially of cellulose fibers and an effective amount of a flame retarder in the form of red phosphorus powder encapsulated with a cationized melaminic resin prepared from formaldehyde, triethanolamine, melamine and a monohydroxyl aliphatic alcohol having less than five carbon atoms, in weight percent ratios of 36.04 to 30.85%, 29.87 to 25.57%, 25.27 to 21.62% and 8.82 to 21.96% respectively.

2. The self-extinguishing material according to claim 1 wherein the monohydroxyl aliphatic alcohol is methanol.

3. The self-extinguishing material according to claim 1 wherein the red phosphorus powder is contained in said material in an amount ranging from 4% to 18% by weight.

4. The self-extinguishing material according to claim 3 wherein the red phosphorus powder is contained in said material in an amount ranging from 7% to 13% by weight.

5. The self-extinguishing material according to claim 1 wherein the cellulose fibers are virgin chemical fibers.

6. The self-extinguishing material according to claim 1 wherein the cellulose fibers are reclaimed fibers.

7. The self-extinguishing material according to claim 1 wherein said material consists of paperboard.

8. A method of generating self-extinguishing properties in a cellulosic material which comprises incorporating into said cellulosic material an effective amount of melamine-encapsulated red phosphorus powder, said red phosphorus powder being encapsulated by a melamine condensate prepared from formaldehyde, methanol, triethanolamine and melamine in weight-percent ratios of 36.04–30.85%, 8.82–21.96%, 29.87–25-57% and 25.27–21.62%, respectively.

9. The method defined in claim 8 wherein the melaminic resin encapsulated red phosphorus powder is added in amount of 4 to 15% by weight of the resulting mixture.

10. The method defined in claim 9 wherein the melaminic resin makes up 3 to 5% of the melaminic resin-encapsulated red phosphorus powder.

* * * * *